(12) United States Patent
Kurohata

(10) Patent No.: US 11,503,171 B2
(45) Date of Patent: *Nov. 15, 2022

(54) INSPECTION SYSTEM, INSPECTION METHOD, AND INSPECTION PROGRAM

(71) Applicant: KONICA MINOLTA, INC., Tokyo (JP)

(72) Inventor: Takao Kurohata, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,745

(22) Filed: Jan. 12, 2022

(65) Prior Publication Data

US 2022/0141346 A1  May 5, 2022

Related U.S. Application Data

(63) Continuation of application No. 17/482,516, filed on Sep. 23, 2021, now Pat. No. 11,277,530, which is a
(Continued)

(30) Foreign Application Priority Data

Apr. 8, 2019  (JP) .............................. JP2019-073365

(51) Int. Cl.
*H04N 1/00* (2006.01)

(52) U.S. Cl.
CPC ..... *H04N 1/00477* (2013.01); *H04N 1/00018* (2013.01); *H04N 1/00045* (2013.01); *H04N 1/00076* (2013.01)

(58) Field of Classification Search
CPC ....................... H04N 1/00045; H04N 1/00034
(Continued)

(56) References Cited

U.S. PATENT DOCUMENTS 11,277,530 B2 * 3/2022 Kurohata ........... H04N 1/00477
2006/0110009 A1 5/2006 Klassen et al.
(Continued)

FOREIGN PATENT DOCUMENTS

JP  10-222676 A  8/1998
JP  10-269359 A  10/1998
(Continued)

OTHER PUBLICATIONS

Notice of Reasons for Refusal issued in Japanese Patent Application No. 2019-073365, dated Sep. 27, 2022, with English Translation (6 pages).

*Primary Examiner* — Jamares Q Washington
(74) *Attorney, Agent, or Firm* — Buchanan Ingersoll & Rooney PC

(57) ABSTRACT

An inspection system includes: an inspection part that compares a scanned image obtained by scanning a sheet on which an image is formed on the basis of a job with a reference image prepared in advance and thereby performs inspection of the scanned image; and a hardware processor that sets an inspection target page to be a target of inspection and a non-inspection target page to be excluded from inspection, for the job, wherein the hardware processor causes the inspection part to perform inspection for the inspection target page and not to perform inspection for the non-inspection target page on the basis of the setting of the hardware processor, and the hardware processor creates an inspection report including scanned images of all pages of the job including the non-inspection target page.

21 Claims, 9 Drawing Sheets

Related U.S. Application Data continuation of application No. 16/808,468, filed on Mar. 4, 2020, now Pat. No. 11,159,688.

(58) Field of Classification Search
USPC .............................. 358/3.26, 504; 382/112
See application file for complete search history.

(56) References Cited

U.S. PATENT DOCUMENTS

| | | |
|---|---|---|
| 2007/0291977 A1 | 12/2007 | Mccomb |
| 2008/0013848 A1 | 1/2008 | Wu et al. |
| 2011/0069357 A1* | 3/2011 | Austin ............... H04N 1/00811 358/474 |
| 2014/0079293 A1* | 3/2014 | Kitai ..................... G06T 7/0008 382/112 |
| 2014/0160534 A1 | 6/2014 | Nakamura |
| 2020/0322492 A1 | 10/2020 | Kurohata |

FOREIGN PATENT DOCUMENTS

| | | | |
|---|---|---|---|
| JP | 2002-148027 A | 5/2002 | |
| JP | 2003-136818 A | 5/2003 | |
| JP | 2004-045228 A | 2/2004 | |
| JP | 2007-148027 A | 6/2007 | |
| JP | 2007241413 A | 9/2007 | |
| JP | 2008-009868 A | 1/2008 | |
| JP | 2015-121635 A | 7/2015 | |
| JP | 2015141093 A | 8/2015 | |
| JP | 2017-040702 A | 2/2017 | |

* cited by examiner

FIG. 8

| | INSPECTION IMAGE | 1 | 2 | ∧∧<br>∧3∧<br>∧∧ | 4 | 5 |
|---|---|---|---|---|---|---|
| | INSPECTION RESULT | GOOD | FAULTY | | GOOD | GOOD |

| INSPECTION PAGE LIST | JOB PAGE | INSPECTION TARGET PAGE |
|---|---|---|
| | 1 | ○ |
| | 2 | ○ |
| | 3 | – |
| | 4 | ○ |
| | 5 | ○ |

FIG. 11

| MACHINE STATE | JOB LIST | READOUT | STORE | COPY | SCAN | IMAGE PAGE EDIT |
|---|---|---|---|---|---|---|

JOB TICKET     FILE NAME: 1054     JOB TICKET EDIT     ERROR CHECK

TICKET PER PAGE ▽     SHEET No. 1/1

BASIC SETTING

| FILE NAME | 1054 | DISPLAY ALL |
|---|---|---|
| NUMBER OF SETTING | 0001 | |

OUTPUT SETTING

| AUTOMATIC INSPECTION | OFF |
| DOUBLE-SIDE BINDING DIRECTION | LEFT-RIGHT BINDING |
| SORT/GROUP | SORT |
| DISCHARGE SHEET SURFACE | FACE UPWARD |
| DISCHARGE SHEET ORDER | FORWARD |
| PILING PERMISSION | PROHIBITED |
| FOLDED PRINT SURFACE | |
| CASING-IN BINDING | OFF |
| UNNEEDED INDEX SHEET DISCHARGE | DISCHARGE |
| RING BINDING | OFF |
| SEPARATE VERSION OUTPUT | OFF |
| BOTH ENDS CUTTING | OFF |
| CREASE | OFF |
| EXTERNAL FINISHER | NOT USED |
| AUTOMATIC IMAGE QUALITY CORRECTION | OFF |

ADDITIONAL SETTING

| BOOKLET | OFF |

◁ 1/3 ▷

FRONT / BACK     P 1

SHEET SETTING

| PROFILE No. | ... |
| SHEET SIZE | A4 |
| SHEET TRAY | TRAY 1 |
| SHEET TYPE | PLAIN SHEET |
| BASIS WEIGHT | 52–61g/m² |
| SHEET COLOR | WHITE |
| PUNCH | NO PUNCH HOLE |

◁ 1/1 ▷

| | PRINT SURFACE | |
|---|---|---|
| PRINT SURFACE | SINGLE | |

OUTPUT SETTING

| DISCHARGE TRAY | SADDLE STITCH MACHINE SUB-TRAY |
| STAPLE | OFF |
| CENTER FOLDING PER BUNDLE | OFF |
| TRIPLE FOLDING PER BUNDLE | OFF |
| SADDLE STITCH | OFF |
| STAPLE SECTION | OFF |
| FOLDING | OFF |
| PUNCH | OFF |

IMAGE QUALITY ADJUSTMENT

| IMAGE SHIFT | OFF |
| IMAGE POSITION | OFF |
| CONTOUR | OFF |
| IMAGE SCREEN | SCREEN 1/Dot 190 |
| TEXT/GRAPHICS SCREEN | |
| TONE CURVE ADJUSTMENT | OFF |

OTHER SETTINGS

| DOCUMENT SIZE | A3 |
| DOCUMENT TYPE | LANDSCAPE |

◁ 1/2 ▷

SAMPLE OUTPUT     CANCEL     SAVE AS NEW     OVERWRITE

CREATE REPORT INCLUDING NON-INSPECTION TARGET?

YES    NO

INSPECTION SYSTEM, INSPECTION METHOD, AND INSPECTION PROGRAM

This application is a continuation of U.S. Ser. No. 17/482,516, filed on Sep. 23, 2021, which is a continuation of U.S. Ser. No. 16/808,468, filed on Mar. 4, 2020, and which claims the priority of Japanese patent Application No. 2019-073365, filed on Apr. 8, 2019. The entire disclosures of U.S. Ser. No. 17/482,516; U.S. Ser. No. 16/808,468; and Japanese patent Application No. 2019-073365 are incorporated herein by reference in its entirety.

BACKGROUND

Technological Field

The present invention relates to an inspection system, an inspection method, and an inspection program, and more particularly to an inspection system that inspects a scanned image obtained by scanning a sheet on which an image is formed on the basis of a job, an inspection method to be used in the inspection system, and an inspection program that runs on the inspection system.

Description of the Related Art

An image forming apparatus such as multi-functional peripherals (M P) occasionally suffers from dirt due to toner or the like, streaks, and spot-like image noise (referred to as fireflies) occurring in a document image on a sheet, degradation of color reproducibility, or printing alignment accuracy. To handle these, an automatic inspection function is provided in the image forming apparatus to inspect the sheet after image formation. The automatic inspection function is a function that compares an image (reference image) obtained by scanning at the time of proof or sample output before actual printing with an image obtained by scanning during the actual printing (inspection image) to extract a difference between the reference image and the inspection image, thereby determining the quality of the inspection image. In addition, by linking the automatic inspection function with a purge function to exclude output materials from which a difference has been extracted, it is also possible to obtain good output materials alone.

Regarding such image inspection, for example, JP 2007-241413 A discloses a configuration of a page error inspection apparatus that inspects consistency between pages in a printing system that prints individual pages on the basis of document image data, including: a first inspection processor that inspects consistency between the pages on the basis of code information indicating page order obtained from the document image data; and a second inspection processor that inspects consistency between the pages on the basis of code information indicating page order obtained from the document image data and print image data captured from printed material on the basis of the document image data.

JP 2015-141093 A discloses an image inspection apparatus that inspects a scanned image obtained by scanning an image formed and output on a recording medium, including: a scanned image acquisition part that acquires a scanned image generated by scanning the formed and output image; an inspection result acquisition part that acquires a difference image indicating a difference between an inspection image generated on the basis of information of an image to be formed and output in order to perform inspection of the scanned image, and the scanned image, and that acquires an inspection result being a result of determination of a fault in the scanned image on the basis of the difference image; a print condition information acquisition part that acquires a print condition information indicating a condition at the time of image formation and output of an image being a source of the scanned image as an inspection target; a storage processor that performs control to associate the difference image, the inspection result, and the print condition information with each other to be stored in a storage medium as storage information stored by inspection of the image; an evaluation value calculation part that calculates an evaluation value indicating importance of the storage information on the basis of the print condition information and the inspection result; a deletion determination part that determines storage information to be deleted from the storage medium on the basis of the calculated evaluation value; and a deletion processor that deletes the determined storage information to be deleted.

The quality of the inspection image can be determined by comparing the reference image and the inspection image formed on the sheet under the same conditions using the automatic inspection function described above. However, in a case where the reference image and the inspection image have been formed under different conditions, the quality of the inspection image cannot be determined by comparing these conditions. For example, in the case of using sheets such as embossed sheets having same uneven patterns for each of sheets, the unevenness might vary slightly depending on the accuracy (error) at the time of manufacturing the embossed sheet. The variation in the unevenness leads to determination that there is a difference between the reference image and the inspection image formed on uneven patterns. For this reason, pages that use a type of sheet unsuitable for the automatic inspection function are excluded from the inspection target. Such non-inspection target pages are not scanned for inspection, or even when they are scanned, scan data would be discarded with no storage of the inspection image.

As a result, an inspection report indicating an inspection result includes only the inspection image and the inspection result of the inspection target page, disabling providing a print request client with a print result of all the output materials including the non-inspection target page. Moreover, since the inspection report does not include inspection images of non-inspection target pages, it is necessary to find out the non-inspection target page from the actual output materials output in large quantities to check the print results, causing a heavy burden on the user.

SUMMARY

The present invention has been made in view of the above problems, and mainly aims to provide an inspection system, an inspection method, and an inspection program capable of confirming a print result of all output materials including a non-inspection target page.

To achieve the abovementioned object, according to an aspect of the present invention, an inspection system reflecting one aspect of the present invention comprises: an inspection part that compares a scanned image obtained by scanning a sheet on which an image is formed on the basis of a job with a reference image prepared in advance and thereby performs inspection of the scanned image; and a hardware processor that sets an inspection target page to be a target of inspection and a non-inspection target page to be excluded from inspection, for the job, wherein the hardware processor causes the inspection part to perform inspection for the inspection target page and not to perform inspection for the non-inspection target page on the basis of the setting of the hardware processor, and the hardware processor creates an inspection report including scanned images of all pages of the job including the non-inspection target page.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is another example of another inspection report according to an exemplary embodiment of the present invention;

FIG. 11 is a schematic view illustrating an example of a screen (job edit screen) displayed on an inspection system according to an exemplary embodiment of the present invention; and FIG. 12 is a schematic view illustrating an example of a screen (instruction screen) displayed on an inspection system according to an exemplary embodiment of the present invention.

DETAILED DESCRIPTION OF EMBODIMENTS

Figure 1:
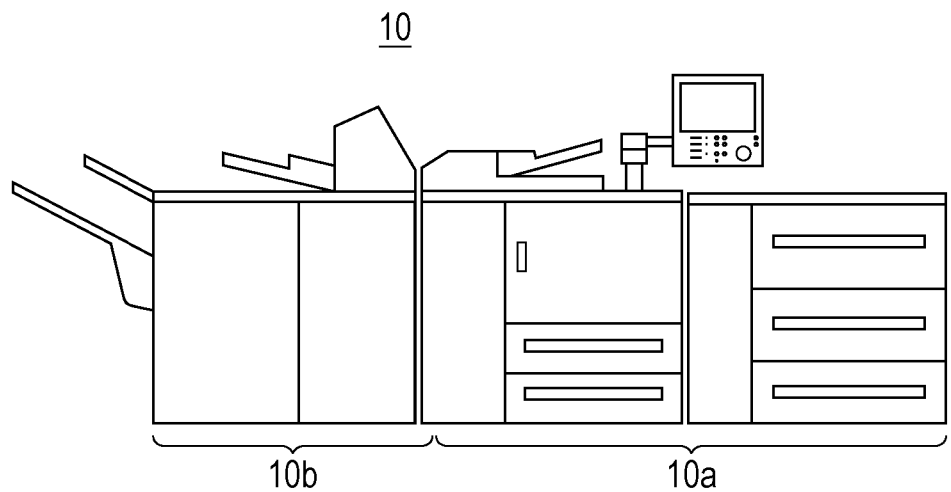
FIG. 1 is a schematic view illustrating a configuration of an inspection system according to an exemplary embodiment of the present invention.

Hereinafter, one or more embodiments of the present invention will be described with reference to the drawings. However, the scope of the invention is not limited to the disclosed embodiments.

As described in Background, image forming apparatuses occasionally suffer from dirt due to toner or the like, streaks, and spot-like image noise (fireflies) occurring in a document image on a sheet, or degradation of color reproducibility or printing alignment accuracy. To handle these, an automatic inspection function is provided in the image forming apparatus to inspect the sheet after image formation.

However, there are cases where sheets such as embossed sheets have slightly varying unevenness for each of sheets. The variation in the unevenness leads to determination that there is a difference between the reference image and the inspection image formed on uneven patterns. Therefore, pages using a type of sheet unsuitable for the automatic inspection function are to be excluded from inspection targets. This, however, disables storage of inspection images for non-inspection target pages.

As a result, an inspection report would include only the inspection image and the inspection result of the inspection target page, disabling providing the print request client with a print result of all the output materials including the non-inspection target page. Moreover, since the inspection report does not include inspection images of non-inspection target pages, it is necessary to find out the non-inspection target page from the actual output materials output in large quantities to check the print results, causing a heavy burden on the user.

To handle this, according to an embodiment of the present invention, the inspection system includes: an inspection part that compares a scanned image obtained by scanning a sheet on which an image is formed on the basis of the job with a reference image prepared in advance and thereby performs inspection of the scanned image; an inspection target setting part that sets an inspection target page to be a target of inspection and a non-inspection target page to be excluded from inspection, for a job; an inspection controller that causes the inspection part to perform inspection for the inspection target page and not to perform inspection for the non-inspection target page on the basis of the setting of the inspection target setting part; and an inspection report creation part that creates an inspection report in a portable document format (PDF) file or the like, including scanned images of all pages including the non-inspection target page.

In this manner, creating an inspection report that enables confirmation of print results including non-inspection target pages makes it possible to confirm the print results of all output materials, allowing the print results to be easily presented to the print request client. Moreover, since the print result can be visually confirmed even for non-inspection target pages, it is not necessary to search for non-inspection target pages from a large amount of output materials, making it possible to reduce the burden on the user. This also makes it possible to prevent outflow of faulty printed materials.

EXEMPLARY EMBODIMENTS

Figure 2:
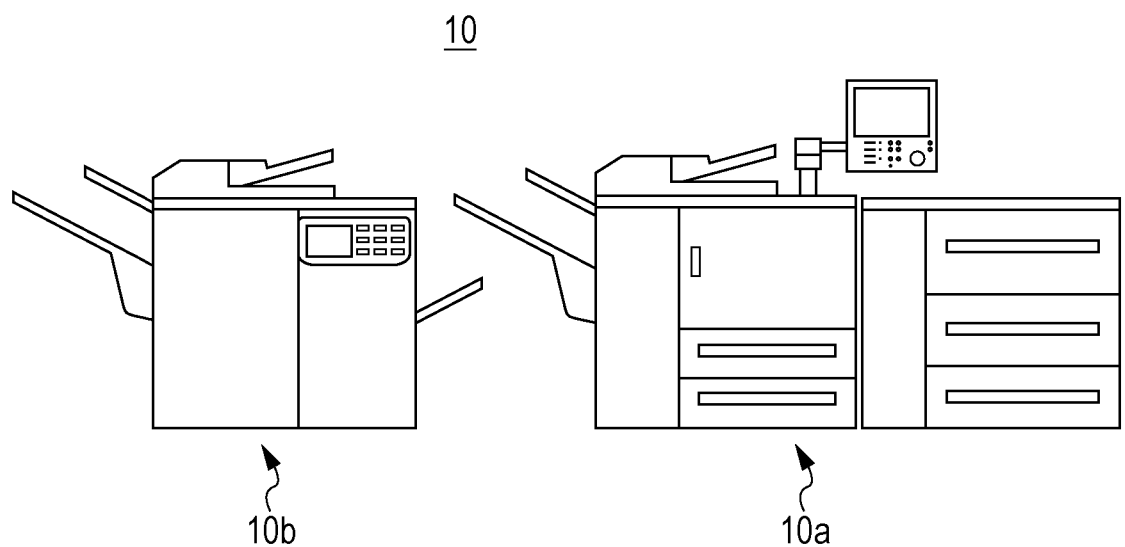
FIG. 2 is a schematic view illustrating another configuration of an inspection system according to an exemplary embodiment of the present invention.
Figure 3A:
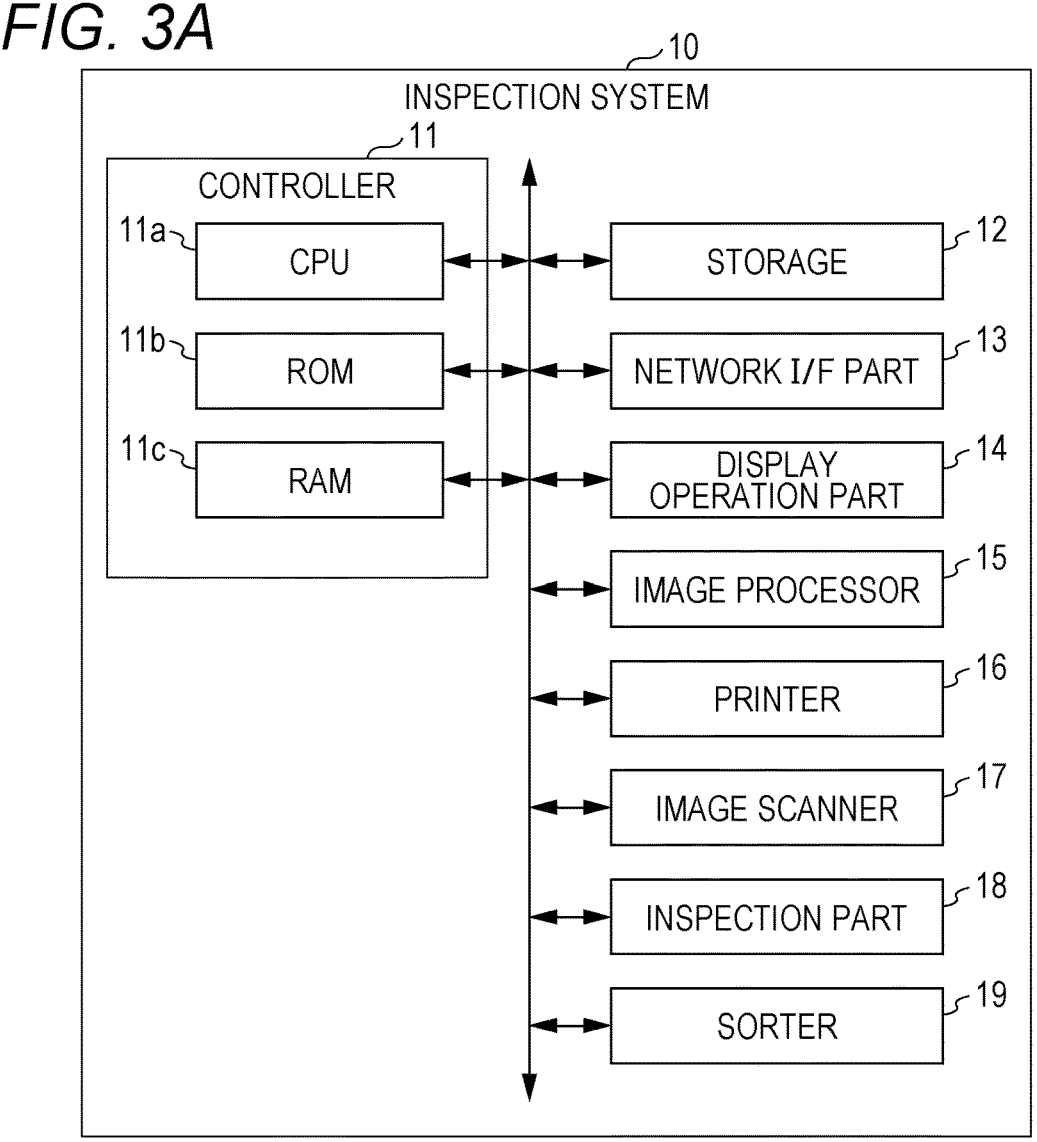
FIGS. 3A and 3B are block diagrams illustrating a configuration of an inspection system according to an exemplary embodiment of the present invention.
Figure 3B:
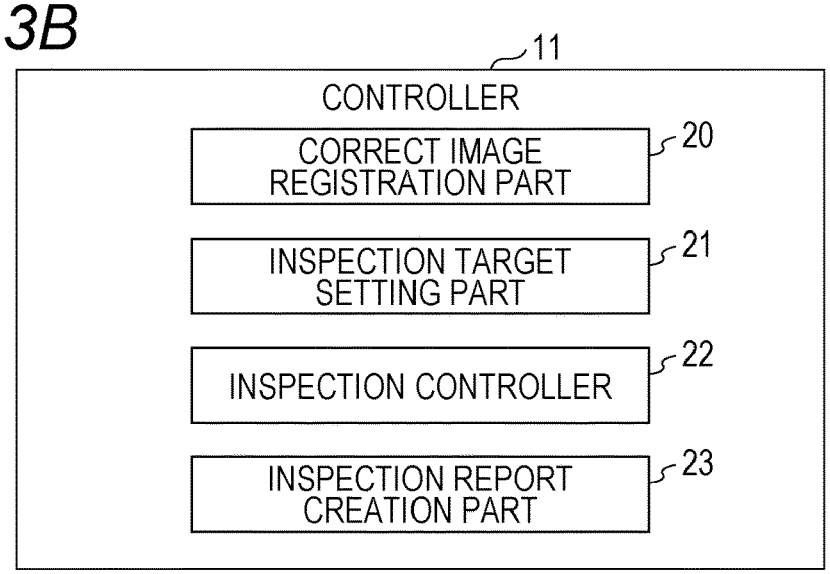
Figure 4A:
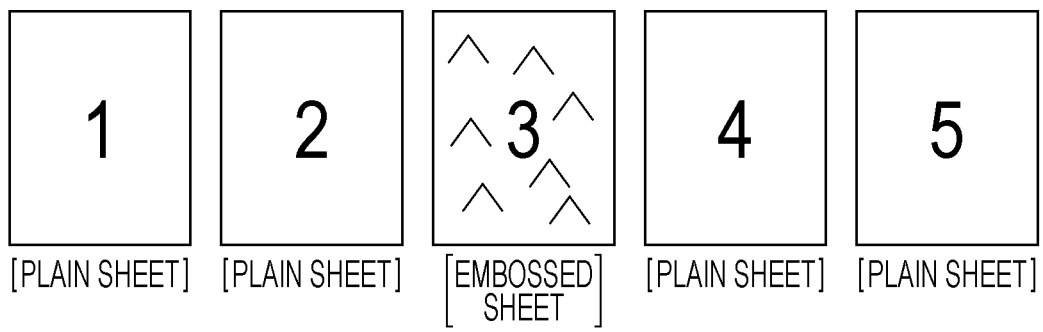
FIGS. 4A to 4C are schematic views illustrating an inspection method (in the case of an embossed sheet) according to an exemplary embodiment of the present invention.
Figure 4B:
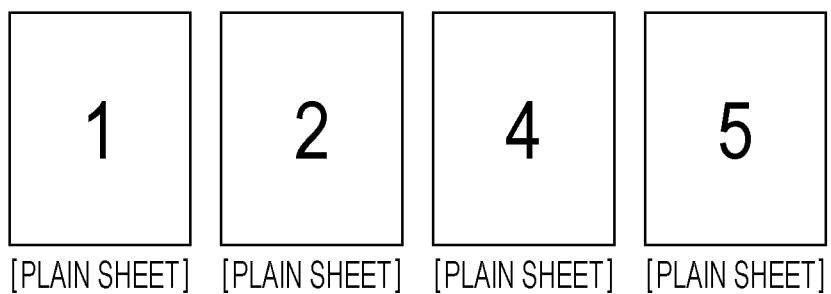
Figure 4C:
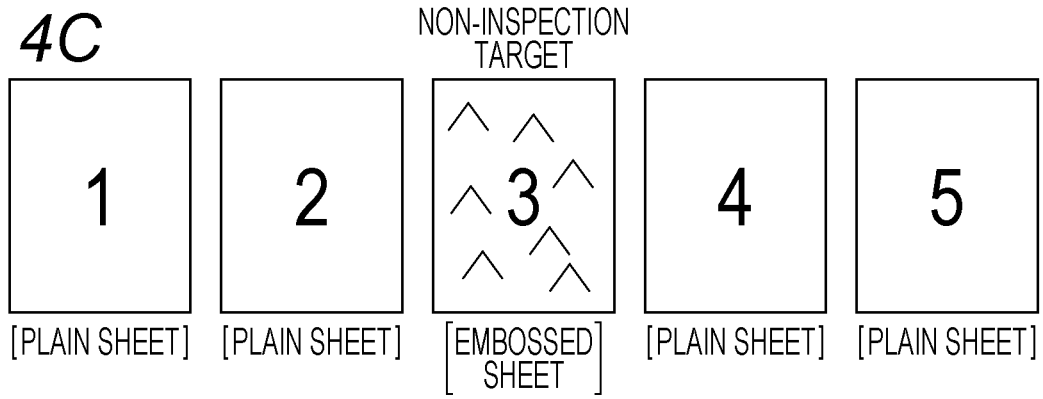
Figure 5:
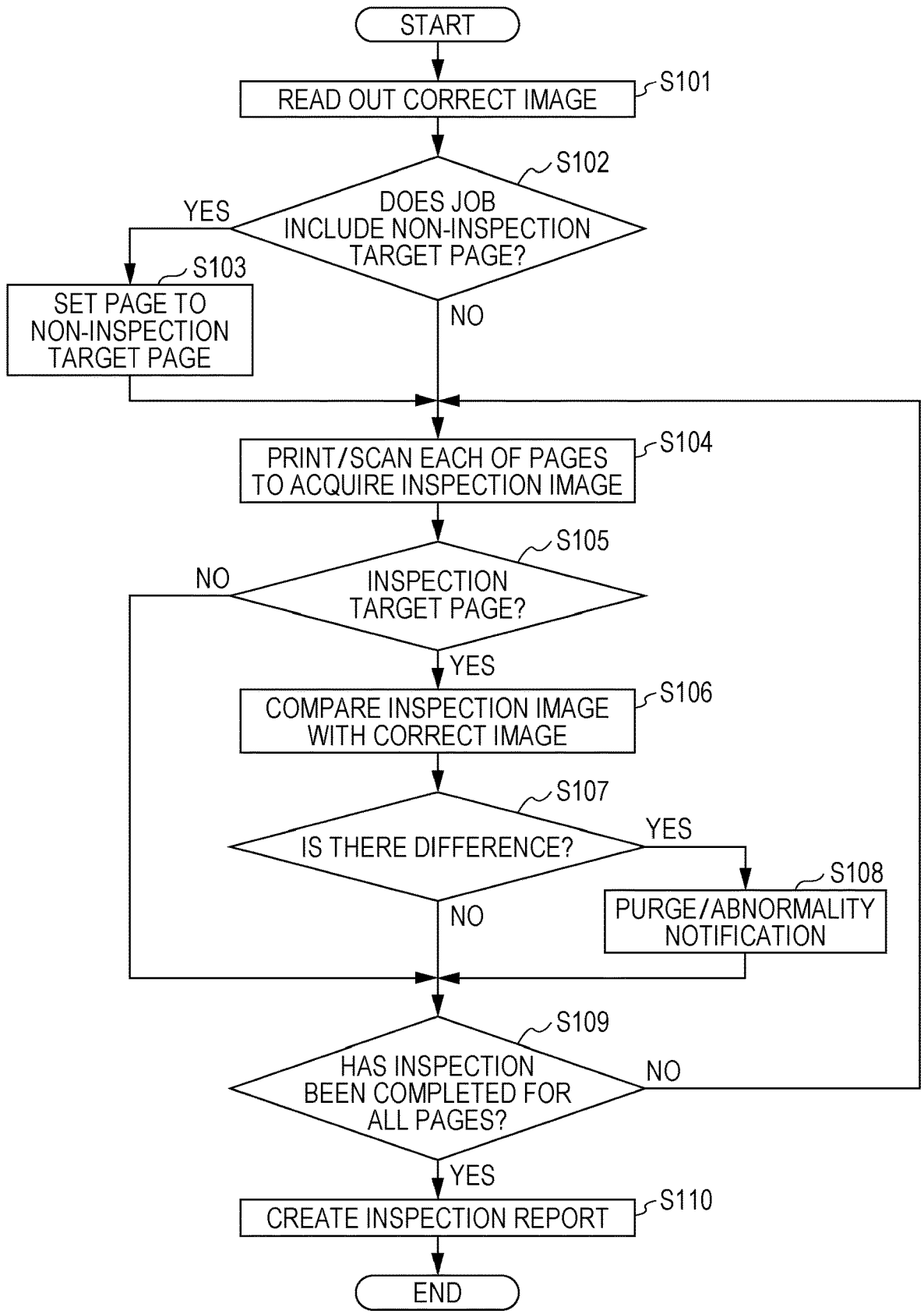
FIG. 5 is a flowchart illustrating operation of an inspection system according to an exemplary embodiment of the present invention.
Figure 6:
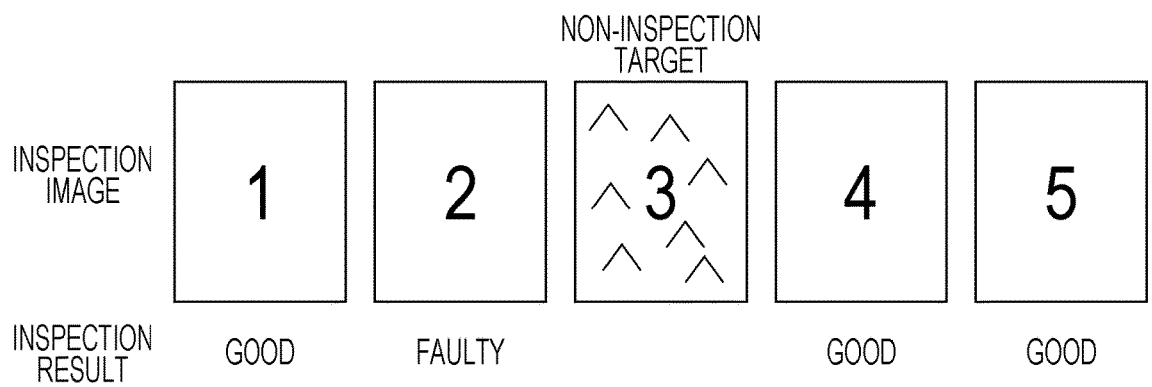
FIG. 6 is an example of an inspection report according to an exemplary embodiment of the present invention.
Figure 7:
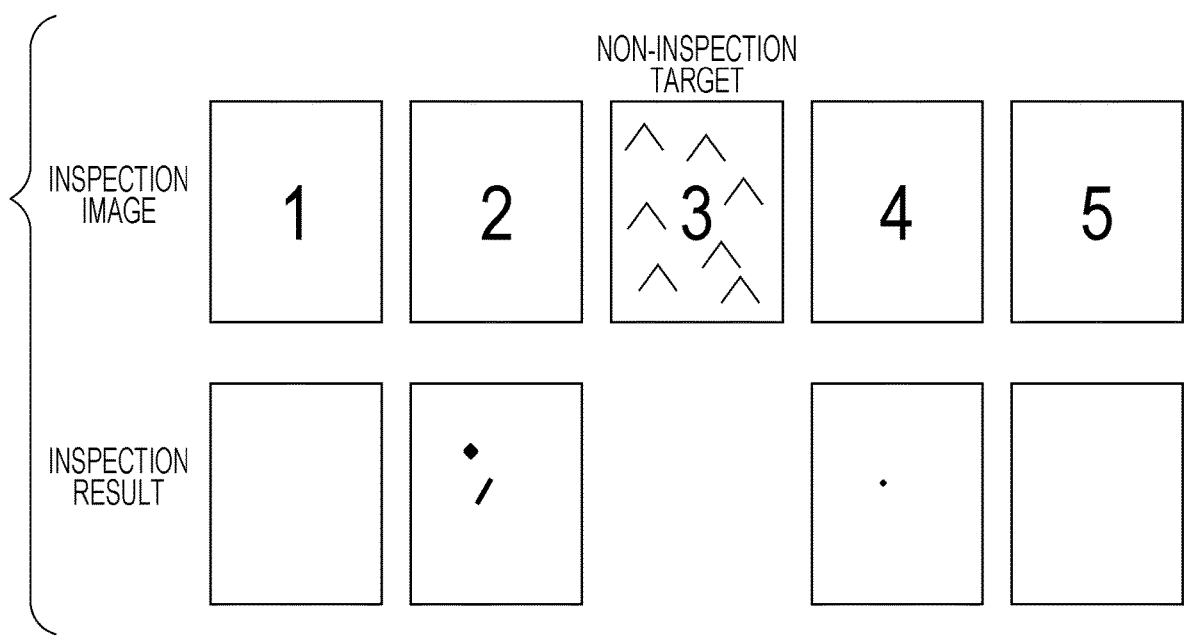
FIG. 7 is another example of an inspection report according to an exemplary embodiment of the present invention.
Figure 9:
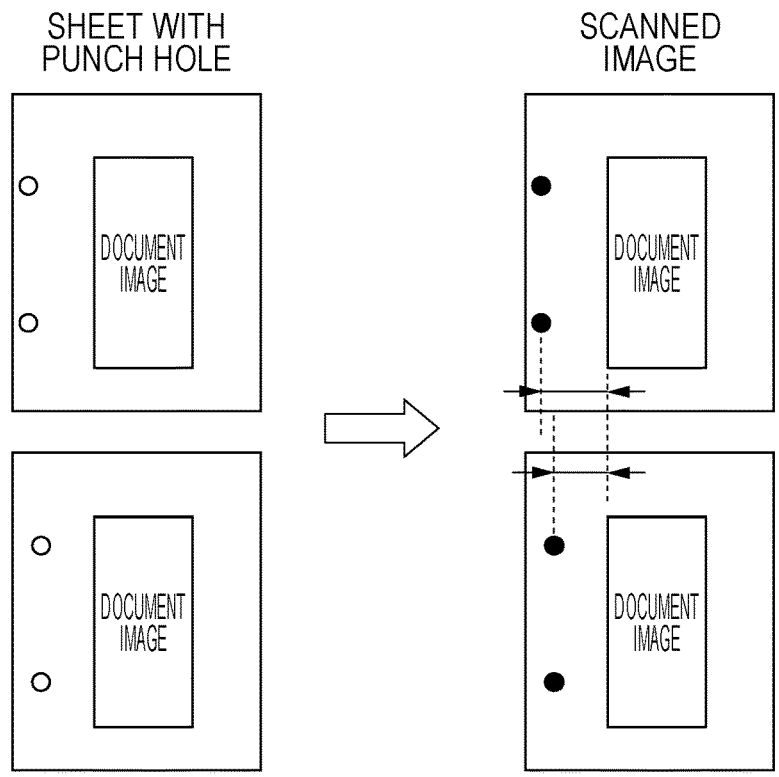
FIG. 9 is a schematic view illustrating a problem when using sheet with punch holes.
Figure 10:
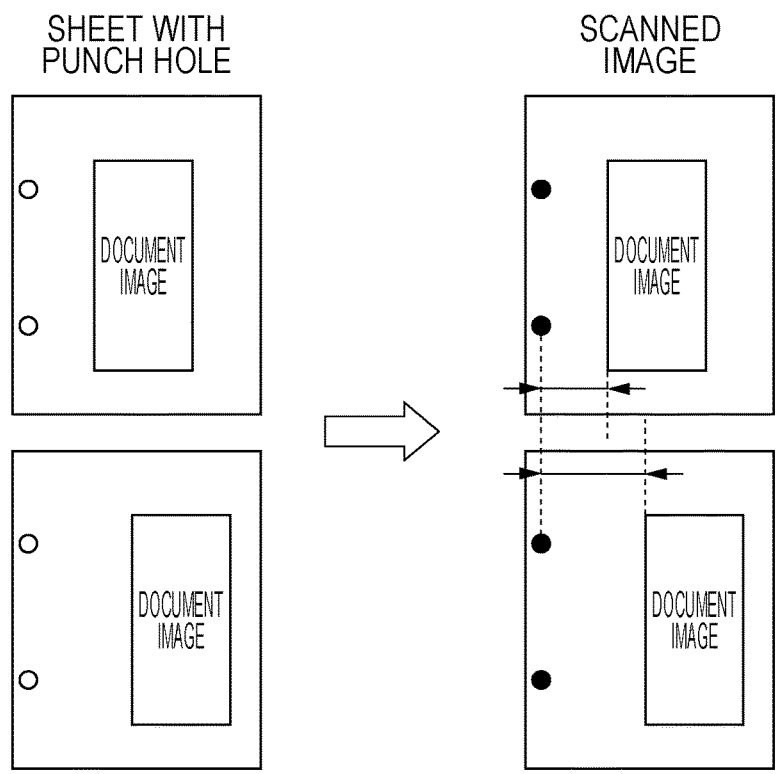
FIG. 10 is a schematic view illustrating a problem when using sheet with punch holes.

In order to give further details on the above-described embodiment of the present invention, an inspection system, an inspection method, and an inspection program according to an exemplary embodiment of the present invention will be described with reference to FIGS. 1 to 12. FIGS. 1 and 2 are schematic views illustrating a configuration of the inspection system of the present exemplary embodiment. FIGS. 3A and 3B are block diagrams illustrating the configuration of the inspection system of the present exemplary embodiment. FIGS. 4A to 4C are schematic views illustrating an inspection method (in the case of embossed sheet) of the present exemplary embodiment. FIG. 5 is a flowchart illustrating operation of the inspection system of the present exemplary embodiment. FIGS. 6 to 8 are examples of an inspection report of the present exemplary embodiment. FIGS. 9 and 10 are schematic views illustrating a problem when using sheet with punch holes. FIGS. 11 and 12 are schematic views illustrating an example of a screen displayed on the inspection system of the present exemplary embodiment.

As illustrated in FIG. 1, an inspection system 10 of the present exemplary embodiment is an apparatus that forms an image on a sheet, inspects the image formed on the sheet and outputs the image. Note that although FIG. 1 illustrates a configuration in which an image forming apparatus 10a for forming an image on a sheet is integrated with an inspection apparatus 10b for inspecting the image formed on the sheet, it is allowable, as illustrated in FIG. 2, to separate the image forming apparatus 10a that forms an image on a sheet from the inspection apparatus 10b that inspects the image formed on a sheet. The following description will be given on the basis of the configuration of FIG. 1.

As illustrated in FIGS. 1 and 3A, the inspection system 10 according to the present exemplary embodiment includes a controller 11, a storage 12, a network I/F part 13, a display operation part 14, an image processor 15, a printer 16, an image scanner 17, an inspection part 18, and a sorter 19.

The controller 11 includes a central processing unit (CPU) 11a, and memory such as read only memory (ROM) 11b and random access memory (RAM) 11c. The CPU 11a reads out a program (including an inspection program) corresponding to the processing content from the ROM 11b or the storage 12 and executes the program developed to the RAM 11c, thereby performing integrated control of operation of the inspection system 10.

The storage 12 includes a hard disk drive (HDD), a solid state drive (SSD), or the like, and stores a program (including an inspection program) for controlling individual components by the CPU 11a, information associated with processing functions of the own device, image data scanned by the image scanner 17, and an inspection report created by an inspection report creation part 23 described below.

The network I/F part 13 includes a network interface card (NIC), a modem, or the like, and connects the inspection system 10 to a communication network such as a local area network (LAN) or a wide area network (WAN) to perform data transmission and reception with external information devices (for example, a client device).

The display operation part 14 includes a touch panel having a pressure-sensitive or a capacitance-type operation part (touch sensor) in which transparent electrodes are arranged in a grid provided on a display part such as a liquid crystal display (LCD) or an organic Electro Luminescence (EL) display, and functions as a display part and an operation part. The display part displays various operation screens (such as a job edit screen and an instruction screen described below), an image formation state, an operation state of individual functions, or the like, in accordance with a display control signal input from the controller 11. The operation part receives user's various input operations (setting of a non-inspection target page on the job edit screen, setting of inspection report creation conditions on the instruction screen, or the like), and outputs an operation signal to the controller 11.

The image processor 15 functions as a raster image processor (RIP), generates intermediate data (display list (DL) as an intermediate language) from a job, rasterizes each of document pages to generate image data in bitmap format. Furthermore, the image processor 15 performs screen processing, gradation correction, density balance adjustment, thinning, halftone processing, or the like on the image data as necessary. Subsequently, the image processor 15 outputs the generated image data to the printer 16.

The printer 16 is an engine that executes a print process. Specifically, the printer 16 includes an exposure part that emits a laser beam to perform exposure on the basis of image data, a photoconductor drum, a developing device, a charging device, a photoconductor cleaner, and a primary transfer roller, and further includes an image former to form a toner image in each of colors Yellow (Y), Magenta (M), Cyan (C), and Black (K), an intermediate transfer belt that functions as an intermediate transfer body that is rotated by rollers to convey a toner image formed by the image former to the sheet, a secondary transfer roller that transfers the toner image formed on the intermediate transfer belt to the sheet, a fixing part that fixes the toner image transferred to the sheet, and a conveyor including a sheet feed roller that conveys the sheet, a registration roller, a loop roller, a reversing roller, and a sheet discharge roller.

The image scanner 17 is a sensor that scans a printed sheet, and an example of this is an in-line sensor provided on a sheet conveyance path between the fixing part of the printer 16 and the inspection part 18. This in-line sensor includes three types of sensors, red (R), green (G), and blue (B), for example, and detects an RGB value corresponding to the amount of light reflected by the sheet, and outputs the value as image data.

The inspection part 18 compares a scanned image (inspection image) obtained by scanning a sheet on which an image is formed on the basis of a job, and a reference image (referred to as a correct image in the present exemplary embodiment) serving as a reference for determination prepared in advance, and thereby determines the quality of the inspection image (the presence or absence of a difference).

The sorter 19 is provided as necessary, and sorts the output material into a good output material without a difference and a faulty output material with a difference on the basis of the inspection result from the inspection part 18, and discharges each of sorted output materials to a different sheet discharge tray.

Furthermore, as illustrated in FIG. 3B, the controller 11 functions as a correct image registration part 20, an inspection target setting part 21, an inspection controller 22, an inspection report creation part 23, or the like.

Prior to actual printing, the correct image registration part 20 registers an image obtained by scanning each of pages of a job by the image scanner 17 to the storage 12 or the like, as a correct image.

The inspection target setting part 21 sets a page as an inspection target (referred to as an inspection target page) and a page to be excluded from a target of inspection (referred to as a non-inspection target page) for the job. For example, the inspection target setting part 21 determines whether the page is a non-inspection target page on the basis of the sheet type information for each of pages included in the job. This sheet type preferably includes one type out of special sheets such as index sheets and embossed sheets, processed sheets having punch holes, and insertion sheets on which no image is to be formed.

The inspection controller 22 causes the inspection part 18 to inspect the inspection target page and not to inspect the non-inspection target page on the basis of the setting of the inspection target setting part 21. In addition, when there is a difference between the inspection image and the correct image, the inspection controller 22 can control the sorter 19 to discharge or purge the page to a sheet discharge tray different from a tray for normal pages, or can cause the display operation part 14 to display a screen indicating that there is a difference between the inspection image and the correct image so as to provide notification of an abnormality.

The inspection report creation part 23 creates an inspection report (for example, a PDF file) including scanned images of all pages of the job including non-inspection target pages. At this time, it is possible to create an inspection report that includes the inspection result and the scanned image for the inspection target page and that includes the scanned image for the non-inspection target page. Furthermore, the inspection report creation part 23 can add, to the inspection report, information that makes it possible to discriminate between the inspection target page and the non-inspection target page. For example, it is possible to combine information indicating that the page is a non-inspection target page to the scanned image of the non-inspection target page, or create an inspection page list and describe the inspection target page and the non-inspection target page so as to enable discrimination from each other, in the inspection page list. The inspection report creation part 23 causes the display operation part 14 to display an instruction screen for allowing the user to designate whether to create an inspection report including a non-inspection target page, as necessary.

The correct image registration part 20, the inspection target setting part 21, the inspection controller 22, and the inspection report creation part 23 may be formed by hardware, or may be formed as an inspection program that causes the controller 11 to function as the correct image registration part 20, the inspection target setting part 21, the inspection controller 22, and the inspection report creation part 23 (in particular, the inspection target setting part 21, the inspection controller 22, and the inspection report creation part 23) so that the CPU 11*a* executes the inspection program.

Next, an inspection method using the inspection system 10 having the above-described configuration will be described with reference to schematic views of FIGS. 4A to 4C. FIGS. 4A to 4C are examples in which the sheet type of some pages of the job is an embossed sheet.

First, the correct image registration part 20 registers a correct image to be a target for comparison at the time of inspection. For example, an image obtained by scanning all pages of a job with a plain sheet is registered as a correct image. At the time of inspection, an inspection job is executed after associating the job to be inspected with the correct image. The sheet type setting of the inspection job can be freely changed by the user. Accordingly, when the third page of a job of 1 to 5 pages is set to an embossed sheet, the configuration will include, as illustrated in FIG. 4A, the first and second pages and the fourth and fifth pages with plain sheets, and the third page alone with an embossed sheet, so as to be a printed material actually output by the user.

The inspection target setting part 21 automatically determines the page having a designation of an embossed sheet set by the user, on the basis of sheet type information in page units included in the job. Subsequently, the inspection controller 22 causes the inspection part 18 to exclude the page from the inspection on the basis of the setting of the inspection target setting part 21. In the case of the configuration of FIG. 4A, the embossed sheet is automatically excluded from the inspection target, and therefore, as illustrated in FIG. 4B, the first and second pages and the fourth and fifth pages excluding the embossed sheet are the inspection targets.

Here, since the inspection result of only the inspection target page is output in the conventional inspection method, inspection images of the first and second pages and the fourth and fifth pages excluding the embossed sheet would only be stored. As a result, it would not be possible to present the print results of all output materials to the print request client, and there would be a need to search for non-inspection target pages from the actual output materials output in large quantities to check the print results.

In contrast, in the present exemplary embodiment, the inspection image of the third page being a non-inspection target page is also stored, and an inspection report (PDF file) including the third page being a non-inspection target is created, as illustrated in FIG. 4C. At this time, information that makes it possible to discriminate the third page as a non-inspection target is added, as necessary, to the file of the third page being the non-inspection target. For example, a text of "non-inspection target" is combined with the scanned image. This makes it possible to confirm the print results of all output materials, allowing the print results to be easily presented to the print request client. This also eliminates the necessity to search for non-inspection target pages from a large amount of output materials, making it possible to reduce the burden on the user. Although FIG. 4C is a case where information enabling discrimination of the page as the non-inspection target is added to the scanned image of the non-inspection target page, it is sufficient that the inspection target page and the non-inspection target page are discriminable. Accordingly, information enabling discrimination of the page as an inspection target may be added to the scanned image of the inspection target page.

Next, operation of the inspection system 10 of the present exemplary embodiment (operation at the time of executing an inspection job) will be described. The CPU 11*a* expands an inspection program stored in the ROM 11*b* or the storage 12 into the RAM 11*c* and executes the program, and thereby executes the processing of each of steps illustrated in the flowchart of FIG. 5. It is assumed that the correct image registration part 20 has registered a correct image in the storage 12 or the like in advance.

First, the controller 11 (inspection controller 22) reads out a correct image from the storage 12 or the like (S101). Next, on the basis of the sheet type setting of the job, the controller 11 (the inspection target setting part 21) determines whether the pages of the job include a page of a sheet type as non-inspection target (S102). In a case where a page of a sheet type as non-inspection target is included (Yes in S102), the page is set as a non-inspection target page (S103).

Next, the printer 16 forms an image of each of pages on the sheet, and the image scanner 17 scans the sheet on which the image of each of pages is formed to acquire an inspection image (S104). Here, in the present exemplary embodiment, in order to allow the inspection image (scanned image) of the non-inspection target page to be included in the inspection report, all pages included in the job are scanned to acquire the inspection image.

Next, the controller 11 (inspection controller 22) determines whether the scanned page is an inspection target page (S105). When the scanned page is not an inspection target page (No in S105), the process skips to S109. When the scanned page is an inspection target page (Yes in S105), the controller 11 (inspection controller 22) causes the inspection part 18 to compare (S106) the inspection image acquired in S104 with the correct image read out in S101.

As a result of the comparison, in a case where there is a difference between the inspection image and the correct image (abnormality detected) (Yes in S107), the controller 11 (inspection controller 22) causes the sorter 19 to discharge or purge the page to a sheet discharge tray different from the sheet discharge tray for normal pages, or causes the display operation part 14 to display a screen indicating that there is a difference between the inspection image and the correct image so as to provide notification of the abnormality (S108).

Thereafter, the controller 11 (inspection controller 22) determines whether inspection of all pages of the job has been completed (S109). In a case where there is an uninspected page (No in S109), the controller 11 returns to S104 and inspects the next page. After completion of the inspection of all the pages (Yes in S109), the controller 11

(inspection report creation part 23) creates an inspection report including the inspection image of all the pages and the inspection result of the inspection target pages (S110), and then displays the created report on the display operation part 14, or outputs the report to the outside as a PDF file.

In the above flow, an inspection report is created and displayed on the display operation part 14 after completion of the inspection of all pages of the job. Alternatively, however, it is also allowable to sequentially create an inspection report for a certain page at a stage of completion of inspection of the certain page (that is, the creation of the inspection report may be started before completion of the inspection of all pages of the job), or it is also allowable to display the inspection report of the page that has been inspected on the display operation part 14 before completion of the inspection of all pages of the job so as to be able to confirm the inspection result. Furthermore, in the above flow, printing, scanning, and inspection are performed for each of pages. However, as illustrated in FIG. 2, in a case where the image forming apparatus 10a and the inspection apparatus 10b are provided as separate apparatuses, it is allowable to print all pages of the job by the image forming apparatus 10a and thereafter perform scanning and inspection for each of pages by the inspection apparatus 10b, or it is also allowable to perform printing and scanning of all pages of the job by the image forming apparatus 10a and thereafter perform inspection for each of pages by the inspection apparatus 10b.

FIGS. 6 to 8 are an example of an inspection report for a job in which the sheet of the third page of pages 1 to 5 is an embossed sheet, and illustrate a case where there is an impermissible difference between the inspection image of the second page and the correct image and where there is a permissible difference between the inspection image of the fourth page and the correct image.

For example, the inspection report creation part 23 creates an inspection report including an inspection image of all pages (pages 1 to 5) and an inspection result of inspection target pages (pages 1, 2, 4, and 5) as illustrated in FIG. 6, or creates an inspection report including the inspection images of all pages (pages 1 to 5) and the difference images between the inspection images of the inspection target pages (pages 1, 2, 4, and 5) and the correct images as illustrated in FIG. 7. At this time, for example, a text indicating that the third page is a non-inspection target is combined with the inspection image of the third page so that the third page can be discriminated as a non-inspection target page. In addition, as illustrated in FIG. 8, the inspection report creation part 23 may create an inspection report including a list explicitly indicating inspection target pages (inspection page list) in addition to the inspection images of all pages (pages 1 to 5) and the inspection results (or difference images) of the inspection target pages (pages 1, 2, 4, and 5). In this case, since it is possible to determine which page is a non-inspection target page using the inspection page list, it would not be necessary to add information indicating that the page is a non-inspection target, to the inspection image.

FIGS. 6 to 8 illustrate an example in which the correct images of all pages are registered and the pages of the inspection job include a non-inspection target page. However, in a case where a non-inspection target page is included at creation of the correct image, a scanned image of the page is not to be stored as a correct image. Therefore, in a case where the inspection job is executed with the setting that all pages are of the sheet type (for example, plain sheet) as inspection targets, the inspection target page corresponding to the page having no correct image stored would be excluded from the inspection. In the present exemplary embodiment, the scanned image of the page excluded from the inspection is also included in the inspection report, making it possible to confirm whether there is a faulty image by checking the scanned image.

In addition, in a case where all pages having correct images stored are determined as the non-inspection target pages, this means a situation where no correct image is present even when the inspection is performed by associating the inspection job with the correct images, leading to non-execution of the inspection job due to stop control of the job. However, in the present exemplary embodiment, even when all pages of the inspection job are non-inspection targets, it is still possible to confirm whether there is a faulty image by checking scanned images since scanned images of all pages are included in the inspection report.

The case where the sheet type is an embossed sheet has been described above as an example. However, the similar applies to cases where the sheet type is special sheets such as index sheets, processed sheets having punch holes, and insertion sheets on which no image is to be formed.

For example, when printing on a sheet with punch holes, there are cases, as illustrated in FIG. 9, where the positions of the punch holes are not constant with respect to the sheet (horizontal positions and the vertical positions of the punch holes might be different). In this case, since an image of the punch hole with respect to the document image in the scanned image might deviate, leading to erroneous detection as a misalignment of the sheet. Further, as illustrated in FIG. 10, even when the position of the punch hole is constant with respect to the sheet, the position of the punch hole might not be constant with respect to the print position of the document image. In this case, either the image of the punch hole or the image of the document would result in mismatch in alignment of the correct image and the inspection image, leading to erroneous determination of an abnormal image. Furthermore, in a case where a residue (burr) remains around the punch hole during the production of the sheet with the punch hole and the residue is captured in one of the correct image or the inspection image, there is a possibility of determination that there is a difference in comparison between the images. In this manner, the case of a sheet having a punch hole also has a possibility that an image is erroneously determined to be faulty. Therefore, a page to be printed on a sheet having a punch hole can be a non-inspection target page.

Moreover, index sheets or insertion sheets on which no image is to be formed are not to be inserted at the time of proof or sample output before actual printing, but are to be inserted only during actual printing, in some cases. In this case, there is no correct image for the index sheets or insertion sheets. In addition, since no document printing is assumed on an index sheet or an insertion sheet, it is not necessary to perform image inspection for the sheet. Therefore, the page of the index sheet or the insertion sheet can be a non-inspection target page, similarly to the above-described sheet with punch holes.

When setting special sheets such as embossed sheets or index sheets, processed sheets having punch holes, insertion sheets on which no image is to be formed, or the like, to non-inspection target pages, it is possible to use a job edit screen 30 as illustrated in FIG. 11. On the job edit screen 30, the user can flexibly set the information of the embossed sheet in the sheet type box (refer to the thick solid line frame) in the sheet setting field (lower center in the figure) of the job edit screen 30. In addition, the user can flexibly perform setting for the sheet with punch holes as to whether there is a punch hole in the punch box (refer to the thick broken line frame) in the sheet setting field (lower center in the figure) of the job edit screen 30. Accordingly, when an embossed sheet or a sheet with punch holes is set in a sheet feed tray, selecting a page in the page selection field (arrow or bar at the top of the figure) and setting an embossed sheet or a sheet with punch holes in the sheet setting field enables printing an image of each of pages of a job on a desired sheet. The sheet type information is used at determination by the inspection target setting part 21 as to whether the page is a non-inspection target page at the timing of execution of an inspection job.

Although the above description is a case where an inspection report is created including an inspection image of a non-inspection target page, it is also possible to allow the user to select whether to include an inspection image of a non-inspection target page in the inspection report. In this case, the inspection report creation part 23 causes the display operation part 14 to display an instruction screen 31 as illustrated in FIG. 12. In a case where "Yes" is selected on the instruction screen 31, the inspection report can be created including the inspection image of the non-inspection target page, and in a case where "No" is selected, the inspection report can be created without including the inspection image of the non-inspection target page.

As described above, the inspection system 10 includes the inspection part 18 that inspects a scanned image by comparing the scanned image obtained by scanning a sheet on which an image is formed on the basis of a job with a reference image prepared in advance. The inspection system 10 includes: the inspection target setting part 21 that sets an inspection target page and a non-inspection target page to the job; the inspection controller 22 that causes the inspection part 18 to perform inspection for the inspection target page and not to perform inspection for the non-inspection target page on the basis of the setting of the inspection target setting part 21; and the inspection report creation part 23 that creates an inspection report including scanned images of all pages of the job including the non-inspection target page. With this configuration, it is possible to confirm printing results of all output materials, allowing print results to be easily presented to the print request client. In addition, since the print result can be visually checked even for a non-inspection target page, it is not necessary to search for a non-inspection target page from a large amount of output materials, and the burden on the user can be reduced.

The present invention is not limited to the exemplary embodiments and the configuration and control can be changed suitably within a range not deviating from the scope and spirit of the present invention.

For example, the above exemplary embodiment has described an example of the inspection system 10 integrating the image forming apparatus 10a with the inspection apparatus 10b. However, the inspection method of the present invention is also applicable to a case where the inspection apparatus 10b is operated in a standalone mode. In that case, the inspection apparatus 10b can include a controller, a storage, an inspection part, and a display operation part as necessary, in which the controller can be set to function as a correct image registration part, an inspection target setting part, an inspection controller, and an inspection report creation part (by causing the CPU of the controller to execute the inspection program).

The present invention is applicable to an inspection system that inspects a scanned image obtained by scanning a sheet on which an image is formed on the basis of a job, an inspection method to be used in the inspection system, an inspection program that runs on the inspection system, and a recording medium recording the inspection program.

Although embodiments of the present invention have been described and illustrated in detail, the disclosed embodiments are made for purposes of illustration and example only and not limitation. The scope of the present invention should be interpreted by terms of the appended claims.

What is claimed is:

1. An inspection system comprising:
a hardware processor that is configured to:
compare a scanned image generated by an image scanner with a reference image and thereby perform inspection of the scanned image;
generate information associated with a result of the inspection; and
display the scanned image on a display monitor, wherein among the scanned image displayed on the display monitor, a first scanned image is displayed on the display monitor together with information regarding abnormality in a case where the result of the inspection indicates that there is image abnormality, and for a second scanned image, only the second scanned image is displayed, and
the first scanned image is a scanned image set as a target of the inspection and the second scanned image is a scanned image set to be excluded from the target of the inspection,
wherein the hardware processor is further configured to display the information associated with the result of the inspection on the display monitor.

2. The inspection system according to claim 1, wherein the first scanned image is a scanned image of a page set as the target of the inspection, and the second scanned image is a scanned image of a page set to be excluded from the target of the inspection.

3. The inspection system according to claim 1, wherein the hardware processor is further configured to determine that there is an image abnormality in a case where there is an impermissible difference in comparison between the scanned image and the reference image.

4. The inspection system according to claim 1, wherein the scanned image generated by the image scanner is set to be excluded from the target of the inspection in a case where the scanned image is a scanned image generated by scanning an embossed sheet on which an image is formed.

5. The inspection system according to claim 1, wherein the scanned image generated by the image scanner is set to be excluded from the target of the inspection in a case where the scanned image is a scanned image generated by scanning an index sheet on which an image is formed.

6. A nontransitory recording medium encoded with a program instructing a computer to perform a method comprising:
comparing a scanned image generated by an image scanner with a reference image and thereby performing inspection of the scanned image;
generating information associated with a result of the inspection; and
displaying the scanned image on a display monitor, wherein
among the scanned image displayed on the display monitor, a first scanned image is displayed on the display monitor together with information regarding abnormality in a case where the result of the inspection indicates that there is image abnormality, and for a second scanned image, only the second scanned image is displayed, the first scanned image is a scanned image set as a target of the inspection and the second scanned image is a scanned image set to be excluded from the target of the inspection, and further comprising displaying the information associated with the result of the inspection on the display monitor.

7. The nontransitory recording medium according to claim 6, wherein the first scanned image is a scanned image of a page set as the target of the inspection, and the second scanned image is a scanned image of a page set to be excluded from the target of the inspection.

8. The nontransitory recording medium according to claim 6, further comprising:

determining that there is an image abnormality in a case where there is an impermissible difference in comparison between the scanned image and the reference image.

9. The nontransitory recording medium according to claim 6, further comprising:

setting the scanned image generated by the image scanner to be excluded from the target of the inspection in a case where the scanned image is a scanned image generated by scanning an embossed sheet on which an image is formed.

10. The nontransitory recording medium according to claim 6, further comprising:

setting the scanned image generated by the image scanner to be excluded from the target of the inspection in a case where the scanned image is a scanned image generated by scanning an index sheet on which an image is formed.

11. A method comprising:

comparing a scanned image generated by an image scanner with a reference image and thereby performing inspection of the scanned image;

generating information associated with a result of the inspection; and displaying the scanned image on a display monitor, wherein among the scanned image displayed on the display monitor, a first scanned image is displayed on the display monitor together with information regarding abnormality in a case where the result of the inspection indicates that there is image abnormality, and for a second scanned image, only the second scanned image is displayed, the first scanned image is a scanned image set as a target of the inspection and the second scanned image is a scanned image set to be excluded from the target of the inspection, and further comprising displaying the information associated with the result of the inspection on the display monitor.

12. The method according to claim 11, wherein the first scanned image is a scanned image of a page set as the target of the inspection, and the second scanned image is a scanned image of a page set to be excluded from the target of the inspection.

13. The method according to claim 11, further comprising:

determining that there is an image abnormality in a case where there is an impermissible difference in comparison between the scanned image and the reference image.

14. The method according to claim 11, further comprising:

setting the scanned image generated by the image scanner to be excluded from the target of the inspection in a case where the scanned image is a scanned image generated by scanning an embossed sheet on which an image is formed.

15. The method according to claim 11, further comprising:

setting the scanned image generated by the image scanner to be excluded from the target of the inspection in a case where the scanned image is a scanned image generated by scanning an index sheet on which an image is formed.

16. The inspection system according to claim 1, wherein the hardware processor is configured to display the information associated with the result of the inspection on the display monitor after completion of the inspection of a job.

17. The inspection system according to claim 1, wherein the hardware processor is configured to display the information associated with the result of the inspection on the display monitor sequentially before completion of the inspection of a job.

18. The nontransitory recording medium according to claim 6, wherein the information associated with the result of the inspection is displayed on the display monitor after completion of the inspection of a job.

19. The nontransitory recording medium according to claim 6, wherein the information associated with the result of the inspection is displayed on the display monitor sequentially before completion of the inspection of a job.

20. The method according to claim 11, wherein the information associated with the result of the inspection is displayed on the display monitor after completion of the inspection of a job.

21. The method according to claim 11, wherein the information associated with the result of the inspection is displayed on the display monitor sequentially before completion of the inspection of a job.

* * * * *